(12) United States Patent  
Michno et al.

(10) Patent No.: US 11,272,275 B1  
(45) Date of Patent: Mar. 8, 2022

(54) MAGNETIC RECOIL FASTENER ASSEMBLY FOR IN-WALL SPEAKER INSTALLATIONS

(71) Applicant: Wisdom Audio Corp., Carson City, NV (US)

(72) Inventors: David J. Michno, Carson City, NV (US); George E. Short, III, Cornville, AZ (US); Matthew C. Trinklein, Reno, NV (US)

(73) Assignee: WISDOM AUDIO CORP., Carson City, NV (US)

( * ) Notice: Subject to any disclaimer, the term of this patent is extended or adjusted under 35 U.S.C. 154(b) by 0 days.

(21) Appl. No.: 17/206,459

(22) Filed: Mar. 19, 2021

Related U.S. Application Data

(60) Provisional application No. 62/992,028, filed on Mar. 19, 2020.

(51) Int. Cl.  
*H04R 1/02* (2006.01)  
*F16B 43/00* (2006.01)

(52) U.S. Cl.  
CPC ............. *H04R 1/026* (2013.01); *F16B 43/00* (2013.01); *H04R 1/023* (2013.01); *H04R 1/025* (2013.01); *H04R 2201/021* (2013.01)

(58) Field of Classification Search  
CPC ........ H04R 1/026; H04R 1/023; H04R 1/025; H04R 2201/021; F16B 43/00  
USPC ....................................................... 381/391  
See application file for complete search history.

(56) References Cited

U.S. PATENT DOCUMENTS

| | | | |
|---|---|---|---|
| 1,887,185 | A | 11/1932 | Quinby |
| 2,821,260 | A | 1/1958 | Shaffer |
| 4,296,280 | A | 10/1981 | Richie |
| 4,640,381 | A | 2/1987 | Tsuchiya |
| 4,860,369 | A | 8/1989 | Koshimura |

(Continued)

FOREIGN PATENT DOCUMENTS

GB 2343912 B 7/2002

OTHER PUBLICATIONS

Ningbo Sunrise Magnetic Material Co, Ltd, "Ring magnets with screw hole for fixing" product webpage, <http://sunrisemagnetic.en.hisupplier.com/product-1058876-Ring-magnets-with-screw-hole-for-fixing.html>, (accessed Dec. 12, 2019).

(Continued)

*Primary Examiner* — Sean H Nguyen  
(74) *Attorney, Agent, or Firm* — Polson Intellectual Property Law, PC; Margaret Polson; Christopher Sylvain

(57) ABSTRACT

A magnetic recoil fastener assembly comprises a fastener with a head and a shank, and two annular magnets. When assembled, the annular magnets are arranged on the shank of the fastener to magnetically repel each other. At least the magnet arranged closer to the head of the fastener has a varying inner diameter of its axial opening, including a first diameter at one end which is larger than the width of the head, and a second diameter which is smaller than the width of the head. The end having the larger first diameter is arranged facing the head of the fastener. Also described are in-wall speaker assemblies including such magnetic recoil fastener assemblies for magnetically mounting speaker grilles in an adjustable manner, as well as methods for installing such in-wall speaker assemblies using such magnetic recoil fastener assemblies.

25 Claims, 6 Drawing Sheets

(56) References Cited

U.S. PATENT DOCUMENTS

| | | | |
|---|---|---|---|
| 5,082,083 | A | 1/1992 | Draffen |
| 5,331,119 | A | 7/1994 | Leger |
| 5,400,412 | A | 3/1995 | King, Sr. |
| 6,944,310 | B2 | 9/2005 | Ito |
| 7,003,129 | B2 | 2/2006 | Hecht |
| 8,009,857 | B2 | 8/2011 | Bohlender |
| 8,401,214 | B2 * | 3/2013 | Perkins .................. H04R 25/60 |
| | | | 381/326 |
| 2005/0045415 | A1 | 3/2005 | Popken |
| 2005/0263341 | A1 | 12/2005 | Minneci, Jr. |
| 2007/0039777 | A1 | 2/2007 | Whitaker |
| 2013/0156252 | A1 * | 6/2013 | Wang .................... G06F 1/1688 |
| | | | 381/392 |
| 2015/0073205 | A1 | 3/2015 | Ball |
| 2015/0271583 | A1 * | 9/2015 | Wan .......................... B05B 1/18 |
| | | | 239/289 |

OTHER PUBLICATIONS

Sonance, Architectural Series, "Discreet Opening System" data sheet (Jun. 26, 2017) [4 pages].

Sonance, Architectural Series, "Discreet Gypsum Mounting Platform AS38 Round" drawing sheet (Oct. 1, 2014) [1 page].

Sonance, Architectural Series, "Discreet Gypsum Mounting Platform AS38 Square" drawing sheet (Oct. 1, 2014) [1 page].

Sonance, Architectural Series, "Discreet Solid Surface Mounting Platform AS38 Round & Square" drawing sheet (Oct. 1, 2014) [1 page].

Sonance, Architectural Series, "Discreet AS38RS" drawing sheet (Oct. 1, 2014) [1 page].

Sonance, Architectural Series, "ASPC3RS" drawing sheet (Oct. 1, 2014) [1 page].

Sonance, Architectural Series, "Installation Manual: Architectural Series Drywall Mounting Platform" instruction sheet (Apr. 12, 2017) [5 pages].

Sonance, Architectural Series, "Installation Manual: Architectural Series Solid Surface Mounting Platform" instruction sheet (Apr. 13, 2017) [9 pages].

Sonance, Architectural Series, "AS38RS and AS68RS Plaster Shim Quickstart Guide" instruction sheet (Jun. 26, 2017) [4 pages].

Sonance, Architectural Series, "Bandpass Stereo Subwoofer Quickstart Guide" instruction sheet (Jun. 29, 2017) [2 pages].

Sonance, Architectural Series, "AS Bandpass Connector Quickstart Guide" instruction sheet (Jun. 29, 2018) [2 pages].

Sonance, Architectural Series, "[Gypsum] Mounting Platform Specifications" data sheet (2014) [1 page].

Sonance, Architectural Series, "[Solid Surface] Mounting Platform Specifications" data sheet (2014) [1 page].

Sonance, Visual Performance Series, "Discreet Opening System" data sheet (Jun. 2, 2017) [4 pages].

Sonance, Visual Performance Series, "VP38R" drawing sheet (Apr. 9, 2015) [1 page].

Sonance, Visual Performance Series, "VPBPC3R" drawing sheet (Apr. 10, 2015) [1 page].

Sonance, Visual Performance Series, "Instructions Visual Performance Round Speakers" instruction sheet (Jun. 13, 2017) [4 pages].

* cited by examiner

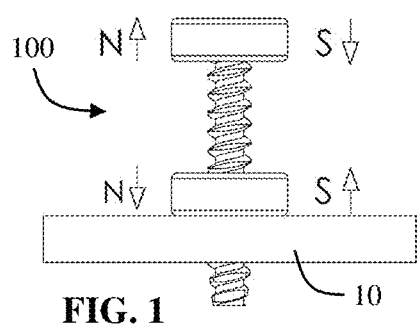 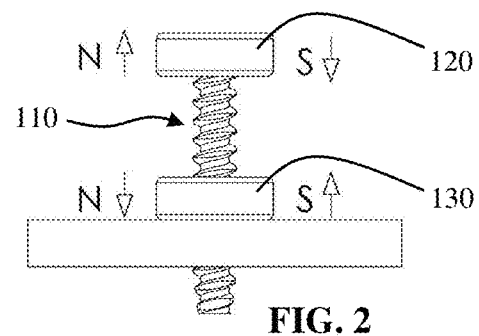
FIG. 1  FIG. 2
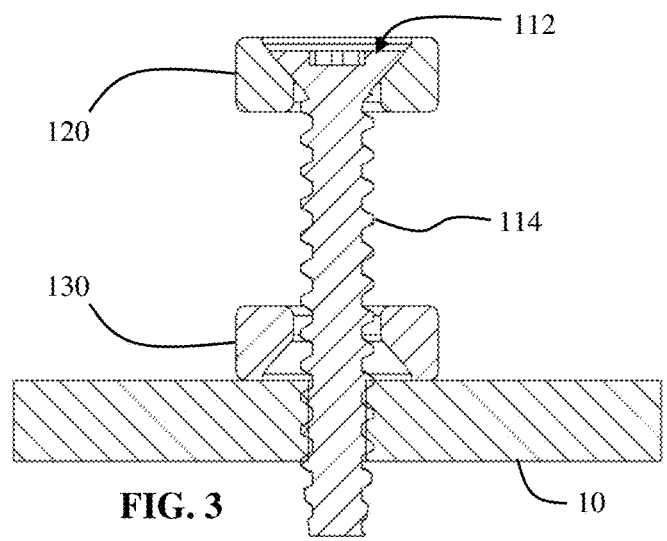
FIG. 3
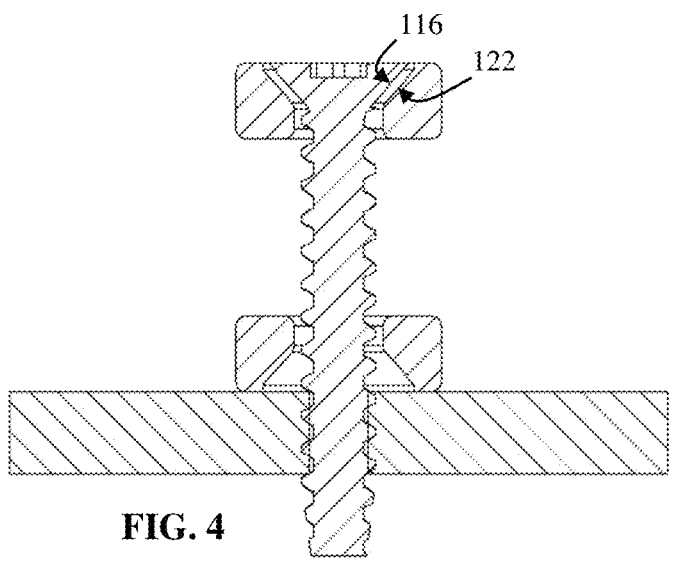
FIG. 4

MAGNETIC RECOIL FASTENER ASSEMBLY FOR IN-WALL SPEAKER INSTALLATIONS

BACKGROUND

The background of the present disclosure relates to in-wall speaker installations. In-wall speaker installations allow for an audio system without occupying open room space, compared to freestanding speakers and on-wall mounted speakers. In-wall speakers can include woofer, midrange and/or tweeter speakers and can be installed in vertical walls, ceilings and/or floors. It is generally desirable that in-wall speakers provide a pleasing aesthetic with the surrounding wall surface. For example, an in-wall speaker's appearance may be minimalized to only its speaker grille for a clean look. In which case, it can be preferable that the position of the speaker grille is flush with the surrounding wall surface, that the means for mounting the grille are not visible from the room space, and that the grille is readily removeable for purposes of cleaning, replacement, painting, etc.

For these reasons, some in-wall speaker assemblies have used magnets to mount metal speaker grilles. In one approach, a ring-shaped speaker grille mounting component is spaced apart from a separate anchoring structure, which structure may be a part of a speaker housing or a woofer connector port depending on the type of speaker. The ring component is coupled to the anchoring structure by screws, with the free ends of the screw shanks being inserted into the anchoring structure and the screw heads being provided on a ring-shaped end surface of the ring component opposite the anchoring structure. The ring component is mechanically biased outward from the anchoring structure by springs positioned between the ring component and the anchoring structure. The end surface of the ring component opposite the anchoring structure and springs also carries magnets, to which the grille is magnetically coupled. The magnets are positioned along this ring-shaped surface along with the heads of the screws. The position and plane of the ring component, and thus the position and plane of the magnets for mounting the speaker grille, can be adjusted by tightening one or more screws inward against the spring force and/or by loosening one or more screws outward away from the anchoring component. While this approach allows for a magnetic and adjustable mounting of the speaker grille, it is also relatively complex requiring numerous components as well as mechanical spring mechanisms.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and depicted in conjunction with systems, tool and methods which are meant to be illustrative, not limiting in scope. In various embodiments, one or more problems above have been reduced or eliminated, while other embodiments are directed to other improvements.

Proceeding from this background, the present disclosure proposes a magnetic recoil fastener assembly, and in particular a magnetic recoil fastener assembly for use with such in-wall speaker installations, though various other use applications are also available. Such a fastener assembly comprises a fastener and two magnets. The fastener has a head at one end and a shank extending from the head. The side of the head facing the free end of the shank forms a magnet contact surface for the first magnet. The first magnet is ring-shaped with a fastener insertion opening for receiving the fastener. The fastener insertion opening of the first magnet has a first inner diameter and a second inner diameter. The first inner diameter is larger than the diameter of the head of the fastener. The second inner diameter is smaller than the diameter of the fastener head, but larger than the diameter of the fastener shank. A fastener contact surface of the first magnet is thus provided between the first inner diameter and the second inner diameter within the fastener insertion opening. The second magnet is also ring-shaped with a fastener insertion opening for receiving the fastener. The fastener insertion opening of the second magnet is at least larger than the diameter of the shank of the fastener.

When assembled, the first and second magnets are arranged along the shank of the fastener to magnetically repel each other, with the first magnet being disposed closer to the head of the fastener than the second ring magnet. Therefore, the first magnet is magnetically biased along the shank in the direction of the head, such that the fastener contact surface of the first magnet contacts the magnet contact surface of the fastener head. The first magnet can be used to carry a mounted element made of a magnetic material, such as a speaker grille or an intermediary installation part for an in-wall speaker assembly. Multiple fastener assemblies can be used depending on the carrying requirements for the mounted element.

In use, the fastener will be anchored with respect to a substrate. By adjusting the depth of the fastener shank with respect to the substrate, the position of the first magnet in its biased position against the fastener head is also adjusted. In this way, the position and plane of a mounted element may also be adjusted. The first magnet, and a mounted element thereon, can be pushed against the magnetic force in the direction of second magnet. This movement may be used to break a drywall or paint seal, for example, where the mounted element is an intermediary component such as a sanding or painting shield used during an installation process.

For speaker applications in particular, it is preferable if the substrate comprises a magnetic material such that the second magnet will magnetically attach to the substrate, and/or the space between the first and second magnets when assembled is such that the second magnet is biased into secure contact with the substrate due to its magnetic force interaction with the first magnet. This can reduce or eliminate vibration of the second magnet on the fastener shank caused by audio output, which vibration could result in an undesirable rattling noise observed by the listener. Likewise, the magnetic repulsion between the first and second magnets can reduce or eliminate vibration of the first magnet on the fastener shank, since the first magnet is biased into contact with the fastener head.

In general, an adjustable magnetic mounting system may include at least one such magnetic recoil fastener assembly, and further comprise a surface which surrounds an opening formed in the surface, a substrate located within the opening and at a distance from the surface surrounding the opening, and a mounted element (e.g., a speaker grille or vent cover) shaped to cover the opening. When assembled, the at least one fastener assembly is arranged within the opening, with the shank of the at least one fastener assembly anchored with respect to the substrate, and the mounted element is magnetically attached to the first ring magnet of the at least one fastener assembly, such that a positional plane of the mounted element is adjustable by adjusting a depth of the fastener of the at least one fastener assembly relative to the substrate. A method for mounting the mounted element with this system may comprise: anchoring the shank of the at least one fastener assembly to the substrate within the opening; magnetically attaching the mounted element to the first magnet of the at least one fastener assembly within the opening; and if the positional plane of the mounted element is not flush with the surface surrounding the opening, then adjusting the depth of the fastener of the at least one fastener assembly relative to the substrate, such that the positional plane of the mounted element is flush with the surface surrounding the opening.

The preceding discussion is provided to introduce a selection of concepts in a simplified form that are further described below. The preceding discussion is not intended to identify key or essential features of the claimed subject matter, nor is it intended to be used to limit the scope of the claimed subject matter. Other features, details, utilities, and advantages will be apparent from the below descriptions of various implementations as further illustrated in the accompanying drawings, wherein like reference characters designate corresponding parts in the several views.

BRIEF DESCRIPTION OF THE DRAWINGS

The present disclosure is described hereinafter based on illustrative embodiments with reference to the following figures:

FIG. 1 shows a side view of an example fastener assembly mounted on a substrate;

FIG. 2 shows a side view of the fastener assembly of FIG. 1 in a second position;

FIG. 3 shows a sectional view of the fastener assembly of FIG. 1;

FIG. 4 shows a sectional view of the fastener assembly of FIG. 2;

Figure 5:
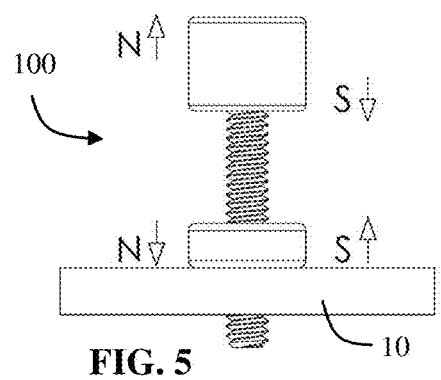
FIG. 5 shows a side view of an example fastener assembly mounted on a substrate.
Figure 6:
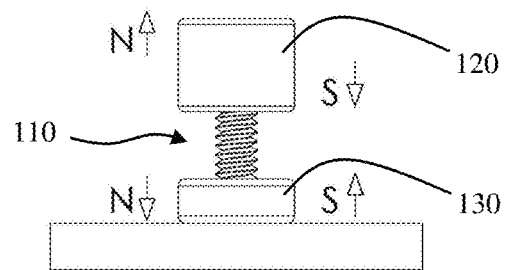
FIG. 6 shows a side view of the fastener assembly of FIG. 5 in a second position.
Figure 7:
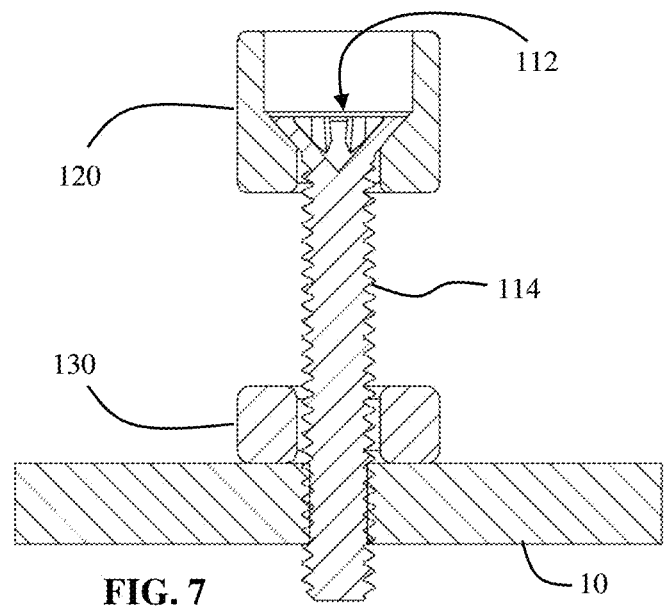
FIG. 7 shows a sectional view of the fastener assembly of FIG. 5.
Figure 8:
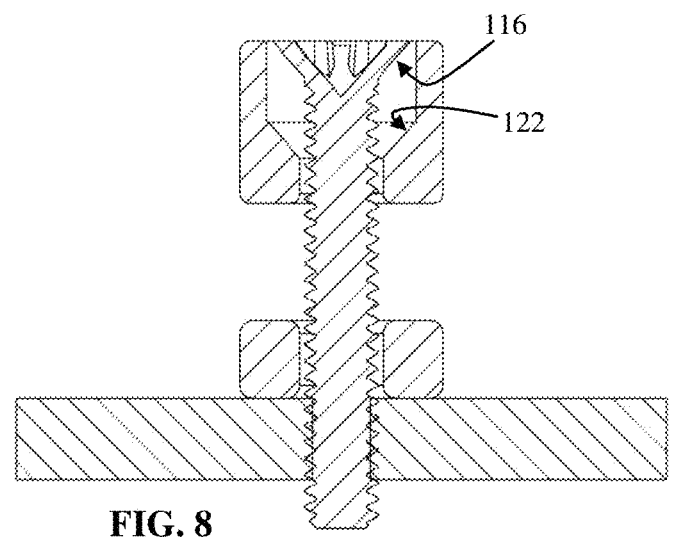
FIG. 8 shows a sectional view of the fastener assembly of FIG. 6.

Before explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Certain terminology is used in the following description for the purposes of clear and concise explanation, which should not be considered or construed as limiting. For example, terms such as "connected" or "attached" include both directly and indirectly connected or attached, respectively, unless expressly indicated otherwise. This applies not only to these specific terms, but also to similar, related, and derivative terms and phrases as well.

Referring now to FIGS. 1-4, a fastener assembly 100 comprises a fastener 110, a first magnet 120, and a second magnet 130. The assembly 100 is shown mounted onto a substrate 10. The fastener 110 has a head 112 at one end and a shank 114 extending therefrom. The side of the head 112 facing in the direction of the shank 114 provides a magnet contact surface 116, which interfaces with a fastener contact surface 122 of the first magnet 120. The fastener 110 itself may be made from a magnetic or non-magnetic material.

The first magnet 120 and second magnet 130 are annular or ring-shaped magnets with a center aperture or insertion opening 124 through which the shank 114 of the fastener 110 is inserted when assembled. The magnets 120, 130 are arranged on the fastener 110 in a manner to magnetically repel each other. The opposing orientation of the north and south poles of magnets 120, 130 is shown by the "N" and "S" labeled arrows in FIGS. 1 and 2.

At least the first magnet 120 has a varying inner diameter dimension. As better seen in FIG. 9, a first inner diameter 126 of the fastener insertion opening 124 is larger than the diameter of the head 112 of the fastener 110, such that the head 112 can pass through a portion of the magnet 120 with this dimension 126. A second inner diameter 128 of the fastener insertion opening 124 is smaller than the diameter of the head 112—such that the magnet 120 cannot be pulled off the fastener 110 in the direction of the head 112—but larger than the diameter of the shank 114 such that the magnet 120 can be displaced along the shank 114 to the head 112. The fastener contact surface 122 of the magnet 120 is provided within the fastener insertion opening 124 and extends between the first inner diameter 126 and the second inner diameter 128.

Due to the opposing magnetic force between the magnets 120, 130 described above, the first magnet 120 is biased against the head 112 in FIGS. 1 and 3. In this position, the fastener contact surface 122 of the magnet 120 abuts the magnet contact surface 116 of the head 112. In FIGS. 2 and 4, the first magnet 120 has been moved along the shank 114 in a direction away from the head 112 against the magnetic force of the second magnet 130. In this position, the fastener contact surface 122 is moved away from and no longer contacts the magnet contact surface 116. In some applications, it is advantageous if the space between the first and second magnets 120, 130 when assembled is selected to be small enough to securely bias the second magnet 120 against the substrate 10 via the magnetic field interaction between the first and second magnets 120, 130 (the size of the space being variable depending on the strengths of the magnets used), and/or if the substrate 10 comprises a magnetic material such that the second magnet 130 is magnetically coupled to the substrate 10.

FIGS. 4-8 show another embodiment of the fastener assembly 100. The previous discussion applies equally here except as otherwise indicated. In this embodiment, the extension of the first magnet 120 along the longitudinal axis of the fastener 110, and the portion of the fastener insertion opening 124 of the first magnet 120 with the larger first inner diameter 126, is greater than in the previous embodiment of FIGS. 1-4 (also compare FIG. 9 with FIG. 11). Therefore, compared to the previous embodiment, the first magnet 120 can be moved from its position biased against the head 112 (see FIGS. 5 and 7) against the opposing magnetic force provided by the second magnet 130 farther along the fastener 110 before the end of the magnet 120 coincides with the plane of the outer end of the head 112 (see FIGS. 6 and 8).

Additionally, the second magnet 130 in the embodiment of FIGS. 5-8 is provided as a simple annular or ring-shaped magnet with a generally constant inner diameter. In the embodiment of FIGS. 1-4, the first magnet 120 and the second magnet 130 share the same construction, meaning either magnet can be selected as the first magnet or second magnet during assembly. Either embodiment may use either approach, and both approaches can be advantageous depending on the circumstances. For example, it may be more cost effective to use ring magnets without a varying inner diameter construction for the second magnet 130. Or it may be more cost effective to source and stock a single component for both magnets. It may also be beneficial to use the same magnet for the first and second magnets since the magnets are then readily interchangeable during assembly and use.

Figure 9:
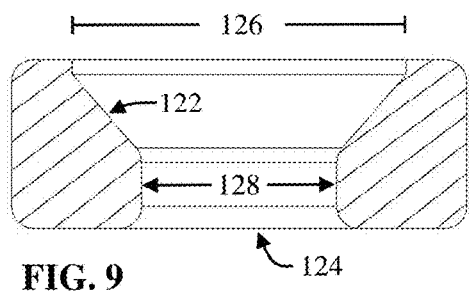
FIG. 9 shows the first magnet of FIGS. 3 and 4 by itself.
Figure 11:
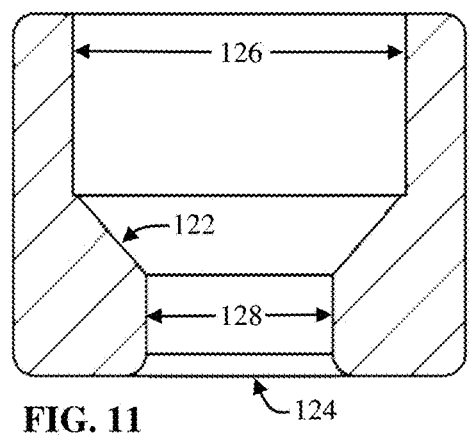
FIG. 11 shows the first magnet of FIGS. 7 and 8 by itself.

Details described above regarding the fastener contact surface 122, fastener insertion opening 124, first inner diameter 126, second inner diameter 128 of the first magnet 120 are better visible in FIGS. 9 and 11 for the embodiments of FIGS. 1-4 and 5-8, respectively.

Figure 10:
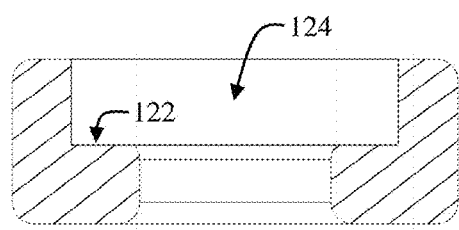
FIG. 10 shows the magnet of FIG. 9 in another embodiment.
Figure 12:
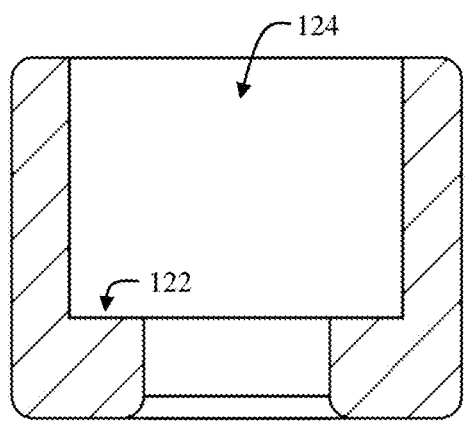
FIG. 12 shows the magnet of FIG. 11 in another embodiment.

FIG. 10 shows an alternative construction for the first magnet 120 of FIG. 9. In this embodiment, the variable inner diameter of the fastener insertion opening 124 is provided as a counterbore, rather than as a countersink as shown in FIG. 9. Therefore, the fastener contact surface 122 extends radially from the longitudinal axis between the first inner diameter 126 and the second inner diameter 128, rather than along the longitudinal axis at an angle as shown in FIG. 9. In this construction, the fastener head 112 may have a flat underside (not shown) rather than a tapered underside as shown in FIGS. 3 and 4, as is common in many types of fasteners, in order to accommodate the interface between the magnet contact surface 116 and the fastener contact surface 122. Of course, the location of the fastener contact surface 122, and therefore the depth of the first inner diameter 126 along the longitudinal axis, can be varied for a given application as desired. FIG. 12 shows the same alternative construction for the first magnet 120 of FIG. 11.

It should be appreciated that although the fastener 110 is shown as a screw with threading along its entire shank 114 mated into the substrate 10, other fastener configurations may also be used for the assembly 100. As described above, the underside of the head 112—which faces the shank 114 and provides the magnet contact surface 116—may be tapered, flat, rounded, etc. The opposite side of the head 112, which faces away from the shank 114, may likewise be flat, round, chamfered, etc. The torque drive for the head 112 may be cross, slot, hex, square, etc. Still further, the fastener 110 may be used with a nut in the manner of a bolt. The shank 114 may be unthreaded in portions, particularly since the head 112 of the fastener 110 in the assembly 100 is intended to be positioned away from the substrate 10 in order to accommodate the magnets 120, 130 therebetween, such that threading can be omitted through this free area of the shank 114. In sum, a wide variety of modifications to the depicted embodiments are possible.

Figure 13:
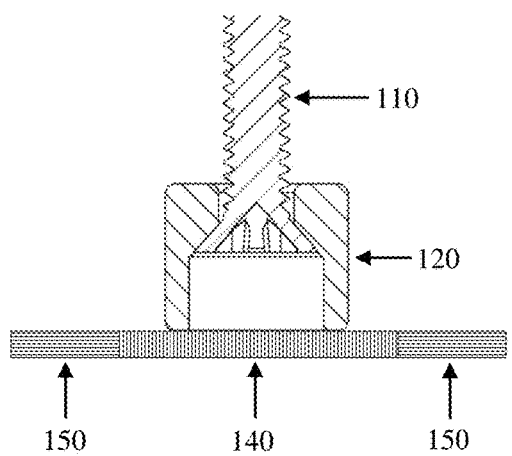
FIG. 13 shows a schematic side sectional view of the head portion of a fastener assembly with an element thereon in a first position.
Figure 14:
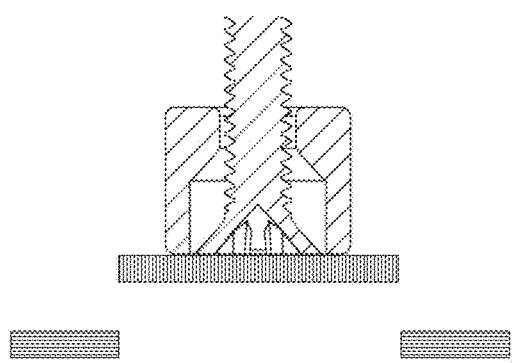
FIG. 14 shows the fastener assembly of FIG. 13 in a second position.

Turning now to FIGS. 13 and 14, a mounted element 140 is schematically shown attached to the head portion of a fastener assembly 100 (the second magnet 130 is omitted here). The mounted element 140 is made of a magnetic material such that it responds to the magnetic field of the first magnet 120 and magnetically couples to the first magnet 120. The position of the fastener 110 with respect to substrate 10 (not shown) has been adjusted such that the mounted element 140 is flush with the surface 150 surrounding the mounted element 140 in FIG. 13. In FIG. 14, the mounted element 140 and the first magnet 120 have been moved in the direction of the shank 114—against the magnetic force of the second magnet 130—until the mounted element 140 is stopped by the head 112 of the fastener 110. Generally, the mounted element 140 will be much larger than shown, such as in the case of a speaker grille, sanding shield plate, or painting shield plate, and in which case, typically supported by multiple fastener assemblies 100. In the case of a sanding shield plate where drywall has been mudded onto element 140 and surfaces 150 opposite the fastener assembly 100, for example, the act of pushing the mounted element 140 out from the position of FIG. 13 into the position of FIG. 14 can be used to break the drywall seam between element 140 and surfaces 150. Likewise, in the case of a painting shield plate where paint has been applied onto element 140 and surfaces 150 opposite the fastener assembly 100, for example, the act of pushing the mounted element 140 out from the position of FIG. 13 into the position of FIG. 14 can be used to break the paint seam between element 140 and surfaces 150.

Figure 15:
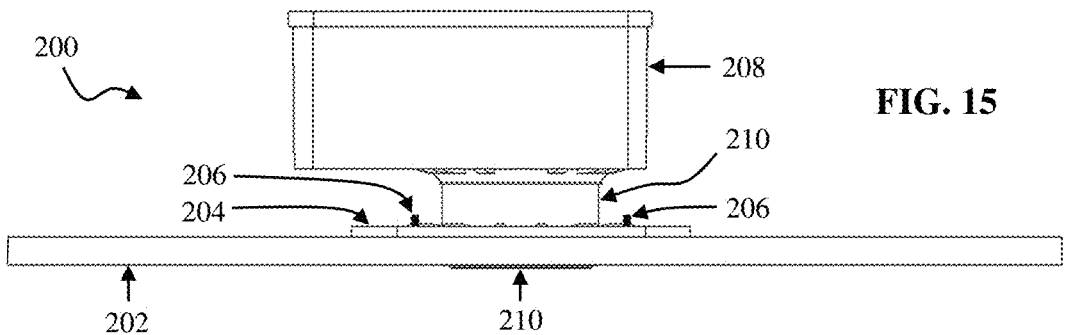
FIG. 15 shows a side view of a speaker assembly.
Figure 16:
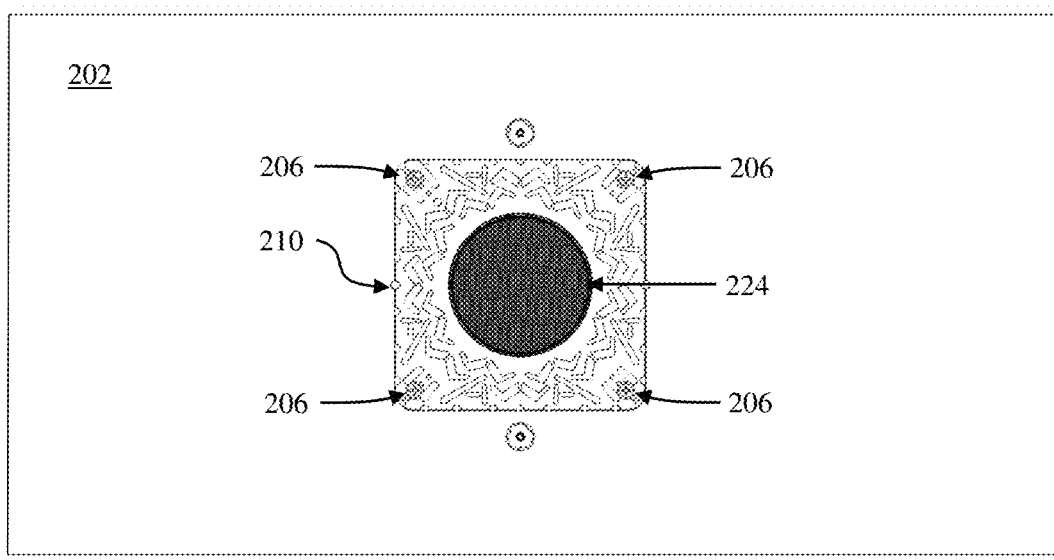
FIG. 16 shows a bottom view of the speaker assembly of FIG. 15.
Figure 17:
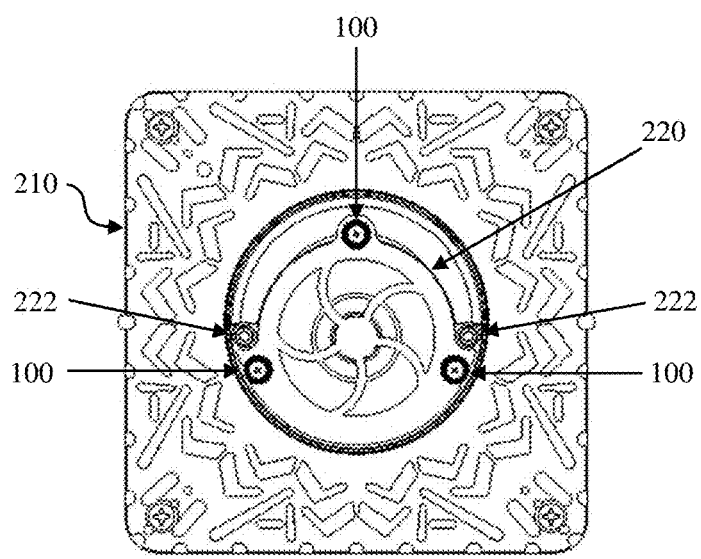
FIG. 17 shows the speaker port of FIG. 16 with the grille removed.
Figure 18:
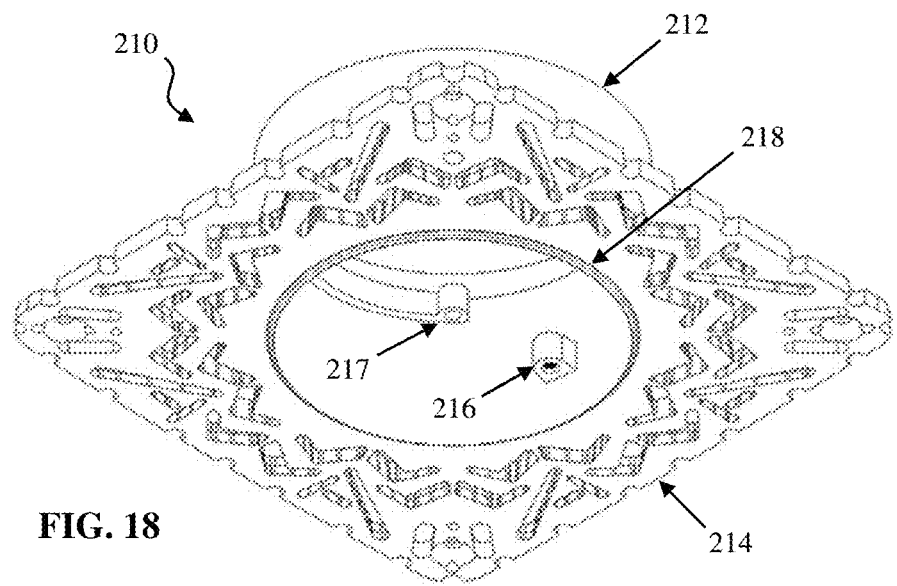
FIG. 18 shows a bottom perspective view of the speaker port of the speaker assembly of FIGS. 15-17 by itself.

Turning now to FIGS. 15-17, a speaker assembly 200 is shown for a ceiling-mounted drywall installation. An assembly mounting panel 202 will replace a portion of the regular ceiling drywall and be secured to one or more load-bearing structures (e.g. building framing). This may be a new build or retrofit installation. A bracket 204 is provided on the top side of the panel 202 for securing, via fasteners 206, a speaker port 210 to the panel 202 in a clamping manner. As better seen in FIG. 18, the speaker port 210 is generally constructed as a hollow cylinder 212 with a perforated mud plate 214 extending radially outward from an end of the cylinder 212. As described in more detail below, bosses 216 are provided along the interior surface of the cylinder 212 (only one boss 216 is visible in the view of FIG. 18; the other boss 217 here is used to attach the midrange speaker 208 to the speaker port 210). The speaker port 210 has a mud dam 218 which projects outward from the perforated mud plate 214 around the opening of the hollow cylinder 212. The mud dam 218 is the portion of the speaker port 210 visible on the bottom side of the panel 202 in FIG. 15; the mud plate 214 is otherwise positioned in a recess formed in the bottom side of the panel 202 and therefore not visible in the side profile view of FIG. 15. Of course, it should be appreciated that the foregoing structures of the speaker port 210 may instead be designed and provided by separate components, rather than a single integral component as shown.

In the depicted assembly 200, a midrange speaker 208 is provided at the end of the speaker port cylinder 212 opposite the perforated mud plate 214. A tweeter speaker 220 is provided within the speaker port cylinder 212 and coupled to speaker port bosses 216 via fasteners 222. The tweeter speaker 220 is smaller than the inner diameter of the port cylinder 212 to allow passage of audio output from the midrange speaker 208 through the port cylinder 212. Therefore, this speaker assembly 200 has good audio range in that the audio output can crossover between the tweeter speaker 220 at higher frequencies to the midrange speaker 208 at lower frequencies, or can be simultaneously output from both speakers. Of course, other embodiments could have just the midrange speaker 208 or just the tweeter speaker 220. In further embodiments (not shown), the audio speaker of the speaker assembly 200 is a woofer attached to the end of the port cylinder 212 opposite the mud plate 214 via a port tube.

After installation, a speaker grille 224 will cover the end of the speaker port cylinder 212 on the side having the mud plate 214 and mud dam 218. The speaker grille 224 is made of a magnetic metal or other material, and magnetically coupled to the first magnets 120 of the fastener assemblies 100. In the depicted speaker assembly 200 of FIGS. 15-17, the fastener assemblies 100 are anchored in the housing of the tweeter speaker 220 (which therefore provides substrate 10 of the previous figures).

Figure 19:
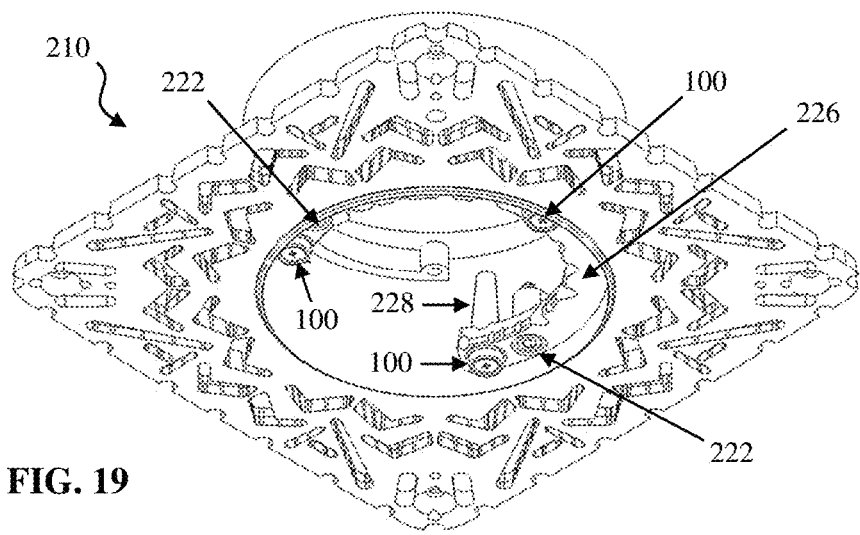
FIG. 19 shows the speaker port of FIG. 18 with a platform component mounted therein carrying fastener assemblies.
Figure 20:
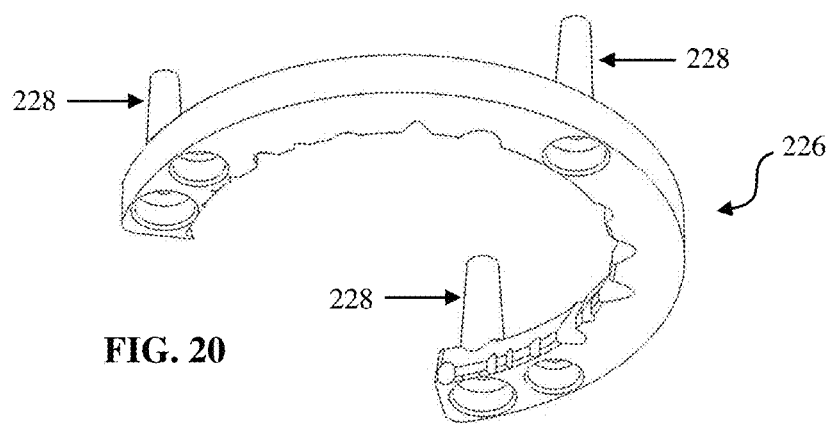
FIG. 20 shows the platform component of FIG. 19 by itself.

In speaker assemblies 200 without a tweeter speaker 220 mounted in the port cylinder 212, such as assemblies with a woofer or the midrange speaker 208 only, the bosses 216 within the cylinder 212 may be used to anchor the fastener assemblies 100 directly. Alternatively, as shown in FIGS. 19 and 20, the cylinder bosses 216 may be used to mount a separate platform component 226 which then provides the substrate structure for the fastener assemblies 100. The platform component 226 is designed to extend around the periphery of the interior surface of the cylinder 212 to leave the cylinder interior mostly open for passage of audio output from the midrange speaker 208 or woofer. For example, the platform component 226 may have a ring or C shape. The platform component 226 provides anchoring points around the periphery of the cylinder 212 for receiving fastener assemblies 100. In the embodiment of FIGS. 19 and 20, the platform component 226 has a C shape with three bosses 228 into which three fastener assemblies 100 are inserted. The fasteners 222—which previously coupled the tweeter speaker 220 to bosses 216 in the arrangement of FIG. 17—couple the platform component 226 to the cylinder bosses 216. The platform component 226 may be readily produced by injection molding, for example, or any other suitable production method.

It should be appreciated that the number, positioning, and spacing of the fastener assemblies 100 may be readily selected and modified in view of the particular carrying requirements for a given application. For example, large or heavy speaker grilles 224 (or sanding/paint shield plates) may require additional fastener assemblies 100, or at least strong first magnets 120, to ensure such mounted elements 140 are sufficiently secure. Thus, the tweeter speaker 220 or the platform component 226 may be designed to carry more, or less, fastener assemblies 100 than depicted, in view of the carrying requirements for the mounted element 140. Therefore, the separate platform component 226 allows the same speaker port 210 to be used, without modification, regardless of the speaker or fastener assembly configuration.

Figure 21:
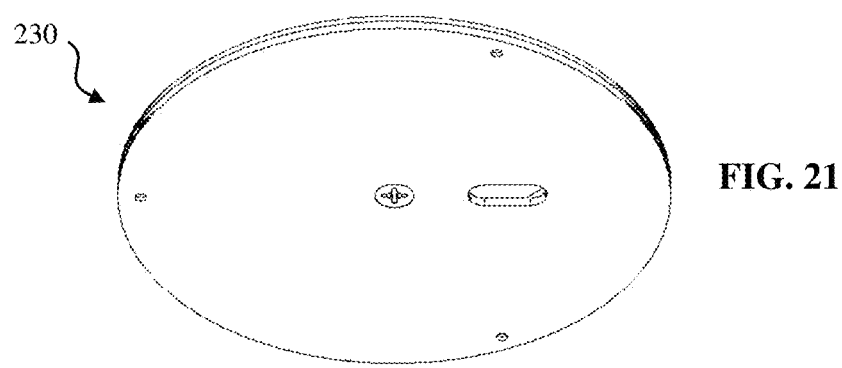
FIG. 21 shows a bottom perspective view of a shield assembly.
Figure 22:
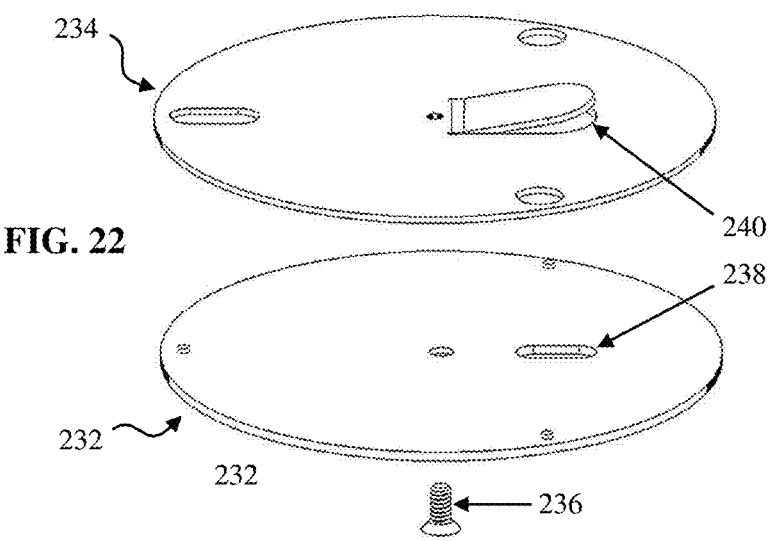
FIG. 22 shows a top perspective exploded view of the shield assembly of FIG. 21.

Note that the speaker assembly 200 is shown here prior to drywall mudding, sanding and painting as now described. During installation, the speaker grille 224 can be replaced by sanding and painting shields, which are removably coupled to together. FIGS. 21 and 22 show one possible configuration for such installation shields. This shield assembly 230 comprises a sanding shield plate 232 and a painting shield plate 234. The plates 232, 234 are coupled together by a fastener 236 through the center thereof. The sanding shield plate 232 has an opening 238 and the painting shield plate 234 has a stamped tab 240 aligned over the sanding shield opening 238. At least the painting shield plate 234 is made of a magnetic metal or other material in order to magnetically couple to the first magnets 120 of the fastener assemblies 100. The sanding shield plate 232 and the painting shield plate 234 generally have the same shape as the speaker grille 224, since these components stand in for the speaker grille 224 during installation and help ensure a clean final aesthetic. Once the panel 202 has been structurally mounted, the magnetic screw assemblies 100 are adjusted to set the sanding shield plate 232 coplanar with the end of the mud dam 218 of the speaker port 210.

In a mudding step, the ceiling surrounding the panel 202, the panel 202, the perforated mud plate 214, and at least the edges of the sanding shield plate 232 are mudded with a drywall compound, generally in multiple layers. Once dry, the mudded drywall is then sanded down to the mud dam 218 to produce a smooth ceiling surface. The sanding shield plate 232, and therefore also the painting shield plate 234, is then pushed upward along the fastener assemblies 100 to break the drywall seam, as described in reference to FIGS. 13 and 14, and the sanding shield plate 232 is removed from the painting shield plate 234. For the depicted shield assembly 230, the installation shield plates 232, 234 are separated by first removing the plate fastener 236. If the sanding shield plate 232 remains in place at that point, a tool (e.g. a screwdriver) may be inserted through the sanding shield opening 238 to act against the paint shield tab 240 and separate the plates 232, 234 from one another.

In a painting step, the sanded ceiling surface is painted through at least the edges of the painting shield plate 234. The painting shield plate 234 is then pushed upward along the fastener assemblies 100 to break the paint seam, as described in reference to FIGS. 13 and 14, and the painting shield plate 234 is removed. Again, a tool inserted into the opening of the paint shield tab 240 may be used, if necessary, to pull the paint shield 234 off the fastener assemblies 100.

At this point, the speaker grille 224 may be mounted to the fastener assemblies 100 in the case of woofer or midrange speaker 208 only speaker assemblies 200, or in the case of the depicted assembly 200 if the installation process was performed with the tweeter speaker 220 already in place. However, it is typically preferable to mud, sand and paint without the tweeter speaker 220 being mounted in the port cylinder 212. This protects the tweeter speaker 220 from particle ingress during installation, and further, ensures there is adequate room within the cylinder 212 to complete the installation steps depending on the component design dimensions. For example, if the tweeter speaker 220 is positioned close to the end of the cylinder 212, it could impede or otherwise interfere with setting the sanding/painting shield plates 232, 234 in the correct position or moving them to sufficiently break the seams. Such considerations also apply where the sanding/paint shield plates are coupled together by a fastener which extends, at least by some amount, longitudinally into the port cylinder 212 past the painting shield, as is the case with the shield fastener 236 in the depicted shield assembly 230. If the tweeter speaker 220 is not mounted within the speaker port 210 during the installation process, the platform component 226 may be used to anchor the fastener assemblies 100 for magnetic coupling with the shield assembly 230. In which case, after painting, the platform component 226 is removed from the port cylinder 212 to allow the tweeter speaker 220 to then be mounted therein as described above.

In any event, the position of the speaker grille 224 is readily adjusted by varying the depth of the fastener 110 of the one or more fastener assemblies 100. This adjustment can be used to ensure the speaker grille 224 is flush with the surrounding ceiling surface as desired.

Once fully installed and positionally set, the first magnets 120 of the fastener assemblies 100 carrying the speaker grille 224 are in the positions shown in FIGS. 1, 3, 5, 7 and 13. It should be noted that the first magnet 120 is already naturally biased downward against the fastener head 112 by gravity for horizontal ceiling-mounted speaker assemblies 200, meaning the second magnet 130 is not strictly necessary to bias the first magnet 120 against the fastener head 112 by default. However, the audio output from the speaker assembly 200 has the potential to vibrate the first magnet 120 and/or grille 224 on the fastener 110, which can cause undesirable rattling sounds during use and thereby decrease the sound quality. The repelling magnetic force of the second magnet 130 further biases the first magnet 120 outward against the head contact surface 122 and therefore helps to reduce or eliminate such vibration. Likewise, the second magnet 130 is preferably magnetically coupled to substrate 10 to reduce the potential for the second magnet 130 to vibrate against the fastener 110 due to audio output, and/or the space between the first and second magnets 120, 130 along the shank 114 is preferably selected to be small enough such that the second magnet 130 is securely biased against the substrate 10 by the repelling magnetic force of the first magnet 120. Such considerations also apply for speaker assemblies 200 installed in vertical walls. Depending on the embodiment, the substrate 10 for the fastener assemblies 100 may be provided by a component of the tweeter speaker housing 220 as in the depicted speaker assembly 200, or the speaker port cylinder bosses 216 directly, or a separate platform component 226 mounted within the speaker port 210 as described above, or any other suitable anchoring structure.

Although the previous description is in the context of an in-ceiling speaker assembly with a smooth drywall finish, it should be appreciated that the systems and benefits described herein may be realized with various other finishes, such as wood, tile, etc., by routine modification to the installation process and components as needed. The disclosed magnetic recoil fastener assemblies may be used to adjust and set a speaker grille and any intermediary installation shields for an in-wall speaker assembly, as desired, regardless of wall finish.

Further, magnetic recoil fastener assemblies, systems and methods described herein may be used in any other contexts where it is desirable to mount a mounted element relative to a surface in an adjustable manner, and not just those related to speaker installations. For example, the fastener assemblies may be used to mount a vent cover in a duct opening, such that the vent cover sits flush with the wall surface surrounding the duct opening. The same applies for other in-wall devices other than speakers, such as sensors or cameras, in which case the design of the mounted covering is readily adaptable to accommodate the functionality thereof while allowing for a magnetic attachment to one or more first magnets of the fastener assemblies (e.g. a magnetic peripheral frame with a visually transparent center in the case of a camera). The surrounding surface—relative to which the mounted cover is adjusted—may be provided by non-wall objects as well, such as tables, counters or cabinetry for example. A wide variety of applications and uses are possible.

While a number of aspects and embodiments have been discussed above, those of skill in the art will recognize certain modifications, permutations, additions and sub-combinations therefor. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

| LIST OF REFERENCE NUMERALS | |
|---|---|
| 10 | substrate |
| 100 | fastener assembly |
| 110 | fastener |
| 112 | head |
| 114 | shank |
| 116 | magnet contact surface |
| 120 | first magnet |
| 122 | head contact surface |
| 124 | fastener insertion opening |
| 126 | first inner diameter of opening |
| 128 | second inner diameter of opening |
| 130 | second magnet |
| 140 | mounted element |
| 150 | surrounding surface |
| 200 | speaker assembly |
| 202 | panel |
| 204 | bracket |
| 206 | bracket fasteners |
| 208 | midrange speaker |
| 210 | speaker port |
| 212 | hollow port cylinder |
| 214 | perforated mud plate |
| 216 | boss |
| 217 | boss |
| 218 | mud dam |

-continued

LIST OF REFERENCE NUMERALS

| | |
|---|---|
| 220 | tweeter speaker |
| 222 | tweeter/platform mounting fasteners |
| 224 | grille |
| 226 | platform component |
| 228 | platform boss |
| 230 | shield assembly |
| 232 | sanding shield plate |
| 234 | painting shield plate |
| 236 | shield plate fastener |
| 238 | sanding shield opening |
| 240 | painting shield tab |

The invention claimed is:

1. A fastener assembly comprising:
a fastener having a head at one end and a shank extending from the head, with an underside of the head facing the shank extending radially outward to provide a magnet contact surface;
a first ring magnet with a fastener insertion opening therethrough for receiving the fastener, the fastener insertion opening having a first inner diameter at one end and a second inner diameter which is smaller than the first inner diameter, wherein the first inner diameter is larger than a diameter of the head of the fastener, wherein the second inner diameter is smaller than the diameter of the head of the fastener but larger than a diameter of the shank of the fastener, and wherein a fastener contact surface of the first ring magnet extends between the first inner diameter and the second inner diameter within the fastener insertion opening;
a second ring magnet with a fastener insertion opening therethrough for receiving the fastener, the fastener insertion opening at least larger in diameter than the shank of the fastener;
wherein, when assembled, the first ring magnet and the second ring magnet are arranged along the shank of the fastener to magnetically repel each other, the first ring magnet being disposed closer to the head of the fastener than the second ring magnet and arranged with the end of the fastener insertion opening having the first inner diameter facing the head of the fastener, such that the fastener contact surface of the first ring magnet is biased toward the magnet contact surface of the head of the fastener.

2. The fastener assembly of claim 1, wherein the fastener contact surface of the first ring magnet extends along a longitudinal axis of the fastener insertion opening and at an angle to said longitudinal axis between the first inner diameter and the second inner diameter.

3. The fastener assembly of claim 1, wherein the fastener contact surface of the first ring magnet extends radially outward with respect to a longitudinal axis of the fastener insertion opening between the first inner diameter and the second inner diameter.

4. The fastener assembly of claim 1, wherein the second ring magnet is designed the same as the first ring magnet.

5. The fastener assembly of claim 1, wherein the inner diameter of the fastener insertion opening of the second ring magnet is constant in extending between opposite ends of the second ring magnet.

6. The fastener assembly of claim 1, wherein the fastener is a screw or bolt.

7. An adjustable magnetic mounting system including at least one fastener assembly according to claim 1 and further comprising:
a surface which surrounds an opening formed in the surface;
a substrate located within the opening and at a distance from the surface surrounding the opening;
a mounted element shaped to cover the opening;
wherein, when assembled, the at least one fastener assembly is arranged within the opening, with the shank of the at least one fastener assembly anchored with respect to the substrate, and the mounted element is magnetically attached to the first ring magnet of the at least one fastener assembly, such that a positional plane of the mounted element is adjustable by adjusting a depth of the fastener of the at least one fastener assembly relative to the substrate.

8. The system of claim 7, wherein the surface is provided by a wall, ceiling, floor, counter, table or cabinetry.

9. The system of claim 7, wherein the mounted element is a speaker grille or vent cover.

10. The system of claim 7, wherein the second ring magnet of the at least one fastener assembly magnetically attach to the substrate.

11. A method for mounting the mounted element with the system of claim 7, the method comprising:
anchoring the shank of the at least one fastener assembly to the substrate within the opening;
magnetically attaching the mounted element to the first magnet of the at least one fastener assembly within the opening; and
if the positional plane of the mounted element is not flush with the surface surrounding the opening, then adjusting the depth of the fastener of the at least one fastener assembly relative to the substrate, such that the positional plane of the mounted element is flush with the surface surrounding the opening.

12. A speaker assembly for an in-wall speaker installation, the speaker assembly including a plurality of fastener assemblies according to claim 1 and further comprising:
a speaker port comprising a hollow port cylinder;
a speaker grille shaped to cover an opening of the hollow port cylinder; and
a speaker attached to the speaker port;
wherein, when assembled, the fastener assemblies are arranged within the hollow port cylinder of the speaker port, with the shanks of the fastener assemblies anchored with respect to a substrate, and the speaker grille is magnetically attached to the first ring magnets of the fastener assemblies, such that a positional plane of the speaker grille is adjustable by adjusting a depth of one or more fasteners of the fastener assemblies.

13. The speaker assembly of claim 12, wherein the second ring magnets of the fastener assemblies magnetically attach to the substrate.

14. The speaker assembly of claim 12, wherein the speaker is positioned in the hollow port cylinder of the speaker port, and a housing of the speaker provides the substrate for the fastener assemblies.

15. The speaker assembly of claim 14, wherein the speaker is fastened with respect to mounting bosses provided within the hollow port cylinder of the speaker port, the mounting bosses formed on an interior surface of the hollow port cylinder.

16. The speaker assembly of claim 12, further comprising a platform component positioned in the hollow port cylinder of the speaker port, the platform component having a ring or C shape which extends around an interior surface of the hollow port cylinder, wherein bosses of the platform component provide the substrate for the fastener assemblies.

17. The speaker assembly of claim 16, wherein the platform component is fastened with respect to mounting bosses provided within the hollow port cylinder of the speaker port, the mounting bosses formed on the interior surface of the hollow port cylinder.

18. The speaker assembly of claim 12, wherein mounting bosses within the hollow port cylinder of the speaker port provide the substrate for the fastener assemblies, the mounting bosses formed on an interior surface of the hollow port cylinder.

19. The speaker assembly of claim 12, further comprising a mounting panel which mounts to a wall, ceiling or floor, wherein the speaker port is secured to the mounting panel.

20. The speaker assembly of claim 19, wherein the speaker port further comprises a perforated mud plate extending transversely outward from an end of the hollow port cylinder.

21. The speaker assembly of claim 20, wherein the mud plate has a mud dam which projects outward to form a lip around the opening of the hollow port cylinder.

22. The speaker assembly of claim 12, wherein the speaker is a tweeter speaker, a midrange speaker or a woofer.

23. A method for installing the speaker assembly according to claim 12 in a surface, wherein the surface is provided by a wall, ceiling or floor, using a shield assembly which includes a sanding plate and a painting plate removably attached together and each shaped to cover the opening of the hollow port cylinder of the speaker port, the method comprising:
  magnetically mounting the painting plate of the shield assembly to the first ring magnets of the fastener assemblies in the hollow port cylinder of the speaker port, and, optionally, adjusting the depth of one or more fasteners of the fastener assemblies such that the sanding plate of the shield assembly aligns with an end of the hollow port cylinder of the speaker port;
  mudding a drywall compound onto the surface surrounding the speaker assembly through to at least edges of the opening of the hollow port cylinder of the speaker port to form a drywall transition surface;
  sanding the drywall transition surface to produce a smooth finish between the surface surrounding the speaker assembly and the opening of the hollow port cylinder of the speaker port;
  pushing the shield assembly further into the hollow port cylinder of the speaker port, such that the first ring magnets are displaced along the fasteners toward the second ring magnets, in order to break any drywall seams formed between the shield assembly and the speaker port;
  removing the sanding plate from the painting plate, and, optionally, adjusting the depth of one or more fasteners of the fastener assemblies such that the painting plate aligns with the end of the hollow port cylinder of the speaker port;
  painting the surface surrounding the speaker assembly through to at least the edges of the opening of the hollow port cylinder of the speaker port;
  pushing the painting plate further into the hollow port cylinder of the speaker port, such that the first ring magnets are displaced along the fasteners toward the second ring magnets, in order to break any paint seams formed between the painting plate and the speaker port;
  replacing the paint shield with the speaker grille, and, optionally, adjusting the depth of one or more fasteners of the fastener assemblies in order to adjust the positional plane of the speaker grille.

24. The method of claim 23, further comprising, at least before the mudding step, mounting a mounting panel of the speaker assembly to align with a plane of the surface surrounding the speaker assembly, wherein the speaker port is secured to the mounting panel.

25. The method of claim 23, further comprising, at least after the painting step, installing the speaker of the speaker assembly into the speaker port.

* * * * *